United States Patent [19]

Rivera, Jr.

[11] Patent Number: 4,640,652
[45] Date of Patent: Feb. 3, 1987

[54] COOLANT DELIVERY SYSTEM

[75] Inventor: Jeremias C. Rivera, Jr., Chicago, Ill.

[73] Assignee: Scully-Jones Corp., Chicago, Ill.

[21] Appl. No.: 880,043

[22] Filed: Jun. 30, 1986

[51] Int. Cl.⁴ .................. B23G 1/46; B23B 51/04
[52] U.S. Cl. .................... 409/136; 10/89 F;
279/20; 408/56; 408/59
[58] Field of Search ............ 409/136; 408/56, 57,
408/59, 141, 142; 279/20; 10/89 F, 141 H;
175/400, 393, 215, 214, 218

[56] References Cited

U.S. PATENT DOCUMENTS

| | | | |
|---|---|---|---|
| 3,024,030 | 3/1962 | Koch | 279/20 |
| 3,487,748 | 1/1970 | Grage | 409/136 |
| 3,905,609 | 9/1975 | Sussman | 408/59 X |
| 4,080,090 | 3/1978 | Kern | 408/59 |
| 4,127,279 | 11/1978 | Wright | 409/136 |
| 4,396,317 | 8/1983 | Staron et al. | 10/89 F X |
| 4,551,045 | 11/1985 | Bossler | 408/59 X |

FOREIGN PATENT DOCUMENTS

| | | | |
|---|---|---|---|
| 3307555 | 9/1984 | Fed. Rep. of Germany | 408/59 |
| 2234077 | 1/1975 | France | 10/139 R |

*Primary Examiner*—William R. Briggs
*Attorney, Agent, or Firm*—Dressler, Goldsmith, Shore, Sutker & Milnamow, Ltd.

[57] ABSTRACT

A tap extension having a dual-mode coolant delivery system is disclosed which is adapted to connect a thread-cutting tap with an associated machine tool spindle having a pressurized coolant supply. The extension includes a generally elongated shank portion, with a locking arrangement provided at one end thereof for receiving and releasably retaining a tap in driven relation with the tap extension. Notably, the tap extension includes a valve arrangement whereby pressurized coolant is directed: (1) through the axial bore of a tap in a first mode of operation, or (2) exteriorly of a solid tap to between its cutting flutes in a second mode of operation. Versatile and efficient thread-forming in either blind holes or through holes is thus facilitated by use of the present construction.

12 Claims, 6 Drawing Figures

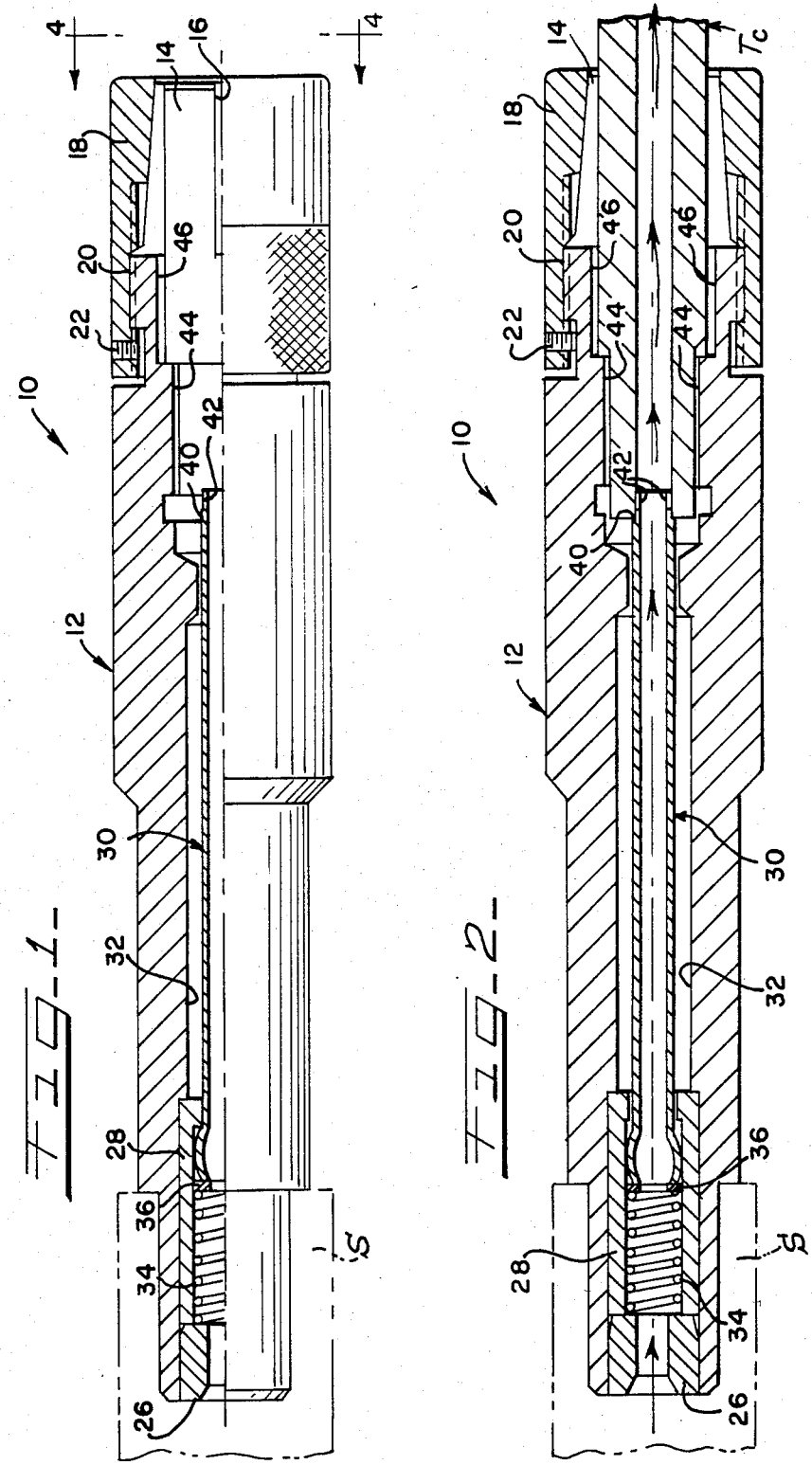

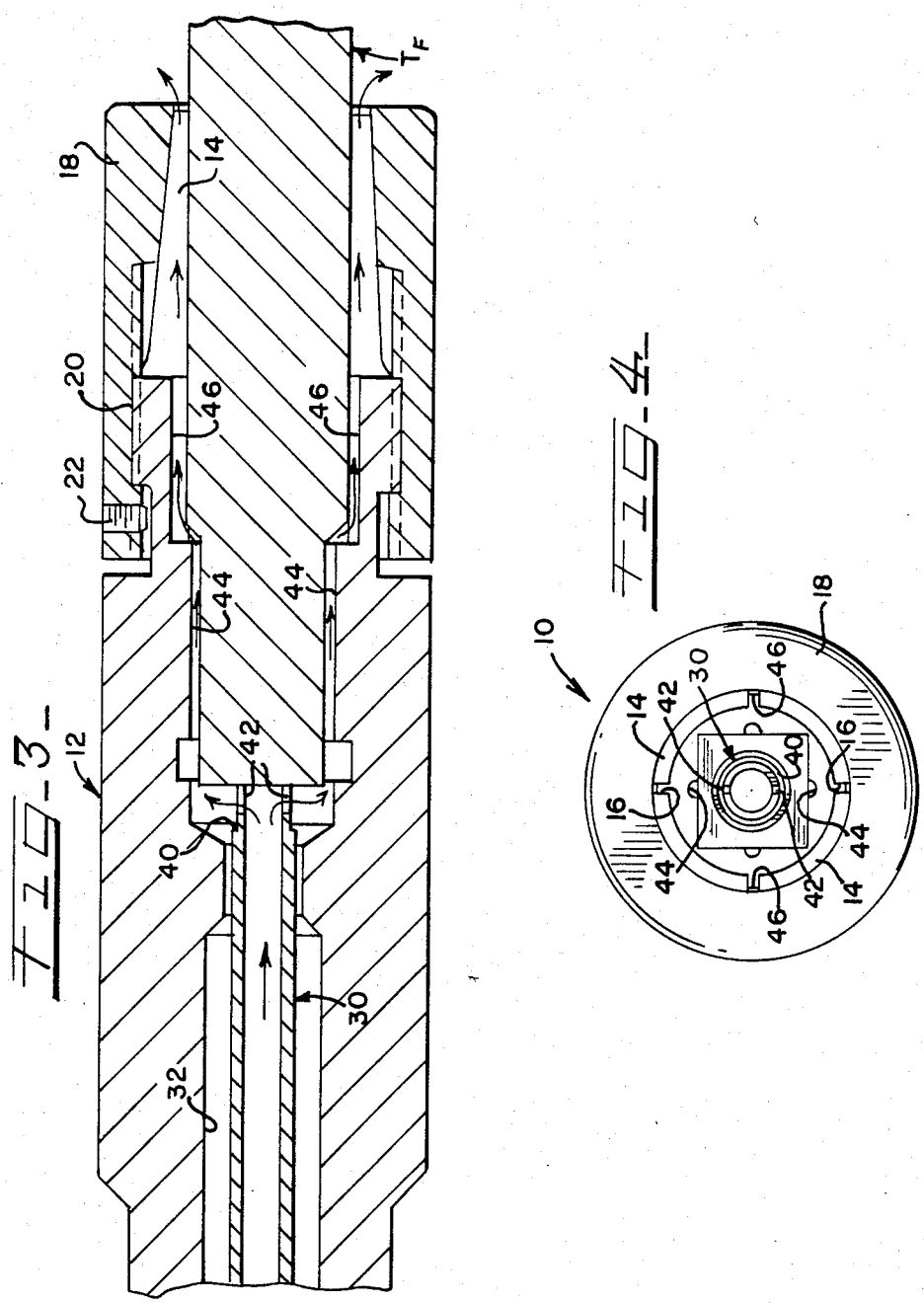

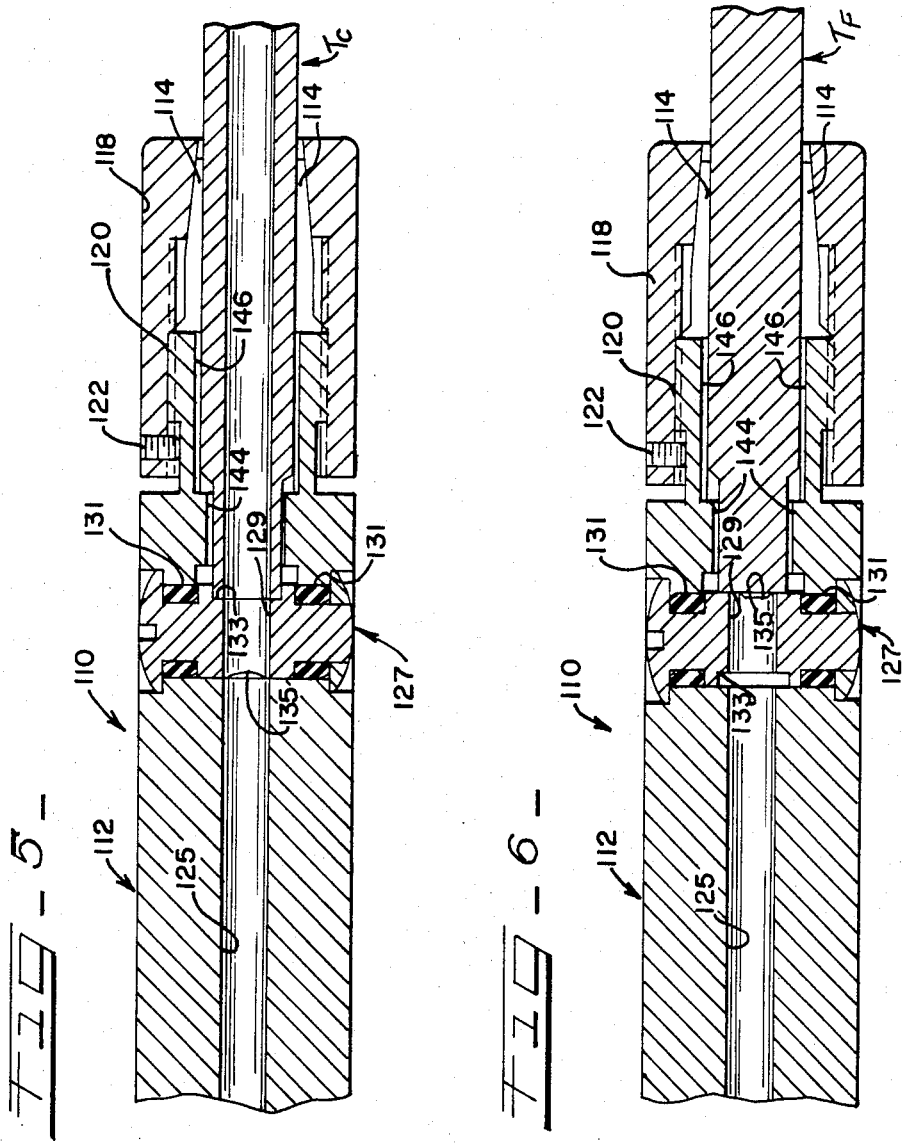

COOLANT DELIVERY SYSTEM

TECHNICAL FIELD

The present invention relates generally to tool holders for connecting rotary cutting tools to an associated machine tool spindle, and more particularly to a tap extension having a dual-mode coolant delivery system for selectively directing coolant through an axial bore of a tap, or exteriorly of a said tap between its cutting flutes.

BACKGROUND OF THE INVENTION

The useful service life of a rotary cutting tool such as a thread-cutting tap is very significantly enhanced by supplying pressurized coolant, typically oil, to the cutting edges of the flutes of the tap. In this manner, heat is very efficiently dissipated from the cutting tap and the workpiece, with the flow of coolant desirably flushing away chips of material being cut by the tool. In practice, machining efficiency is significantly improved due to extended tool life, reduced downtime attendant to tool breakage and replacement, and reduced piece part reworking or scrapping.

One manner in which pressurized coolant fluid is supplied to the cutting edges of a tap entails the delivery of pressurized coolant from an associated machine tool spindle through a bore extending axially through the tap. Tap-receiving tool holders having coolant delivery arrangements are employed for this purpose, and are configured to provide a flow passage for the coolant from the spindle to the axial tap bore.

This type of cutting tap and coolant delivery arrangement is particularly suited for effecting tapping in a blind hole, since pressurized coolant flows from the tip of the tap back along the tap shank between its flutes, thus cooling the tap and flushing away chips as the coolant flows from the blind hole. However, it will be appreciated that this type of tap cooling arrangement is not suited for through hole tapping, since coolant flowing from the tip of the tap tends to merely flow away from the tap through the hole, rather than back along the shank of the tap.

Accordingly, it is very desirable to provide an arrangement for providing pressurized coolant to a cutting tap which acts to cool the tap and flush away chips during through hole tapping. Most preferably, such an arrangement should lend itself for use with taps having an axial coolant bore for blind hole tapping, as well as with solid taps employed during through hole tapping.

SUMMARY OF THE INVENTION

The present invention entails a tool holder comprising a tap extension which has been particularly configured to provide dual modes of coolant delivery to associated cutting taps. In particular, the tap extension is arranged such that in a first mode of operation, pressurized coolant from an associated spindle is directed through the axial coolant bore of a tap, thus particularly suiting the arrangement for blind hold tapping. In a second mode of operation, the present tap extension is configured to direct the pressurized coolant exteriorly of a solid tap to between its cutting flutes, whereby the arrangement is further suited for effecting tapping of through holes in a workpiece.

The tap extension embodying the principles of the present invention is configured for connecting a thread-cutting tap in rotatably driven relation with an associated machine tool spindle, wherein the spindle includes a coolant supply arrangement for delivering pressurized coolant into the tap extension. The tap extension includes a generally elongated body or shank portion having a first end for connection to the machine tool spindle in driven relation therewith. The extension further includes a locking arrangement at a second end of the shank portion opposite its first end, wherein the locking arrangement is adapted to receive and releasably retain the tap in rotatably driven relation with the shank portion. In the illustrated embodiment, the locking arrangement comprises a plurality of circumferentially spaced, collet fingers, and a locking collar rotatably joined to the shank portion of the extension and extending generally about the collet fingers. By this arrangement, rotation of the locking collar relative to the shank portion urges the collet fingers together to engage and grip a tap received therein.

In order to direct coolant from the associated spindle to a tap held by the extension, a coolant passage is provided which extends within and axially of the shank portion of the extension. The coolant passage is joined in fluid communication with the coolant supply arrangement of the associated spindle when the tap extension is connected thereto, whereby pressurized coolant is delivered to the coolant passage.

In accordance with the present invention, a valve arrangement is provided which is operatively associated with the coolant passage for controlling flow of coolant from the passage. Significantly, the valve arrangement provides two modes of operation for the tap extension. In a first mode of operation, coolant is delivered from the coolant passage to an axial coolant bore defined by a first tap. In a second mode of operation, coolant is delivered from the valve arrangement to between the flutes of a second, solid tap. Thus, the present tap extension is particularly suited for versatile use in that coolant can be delivered through either the axial coolant bore of the tap, or exteriorly of a standard, solid tap to between its cutting flutes.

Two embodiments of the present tap extension are disclosed, both of which provide the desired dual modes of operation. In a first embodiment, the valve arrangement of the extension comprises an end portion of a coolant tube which is positioned within the shank portion of the extension, and which at least partially defines the coolant passage which extends within the shank portion. Notably, the end portion of the coolant tube defines at least one coolant slot which communicates with the coolant passage defined by the tube. In the first mode of operation, the end portion of the coolant tube is positionable within the coolant bore of the first cutting tap, whereby flow of coolant through the coolant slot is blocked, and coolant flows through the bore in the tap.

In order to provide the second mode of operation, the end portion of the coolant tube is positioned to abut the end of the second, solid tap received within the collet fingers of the extension. Coolant from within the passage defined by the coolant tube flows through the coolant slot defined by the end portion of the tube, exteriorly of the tap to between the cutting flutes of the tap. To facilitate coolant flow in this manner, the present tap extension includes means defining at least one coolant flow path along the exterior of the solid tap to thereby accommodate flow of coolant from the coolant slot to between the cutting flutes. In the preferred form, this coolant flow path is provided by at least one first coolant groove defined at a drive pocket of the extension shank portion, and by at least one second coolant groove which provides fluid communication between the first coolant groove, and a slot defined by adjacent ones of the collet fingers of the extension.

Thus, in the second mode of operation, coolant flows from within the coolant tube, through the coolant slot defined by the end of the tube, exteriorly of the second, solid tap by flow through the first and second coolant grooves, and between the collet fingers of the extension to between the cutting flutes of the tap.

In an alternate embodiment, the valve arrangement of the tap extension comprises a manually positionable valve member rotatably mounted within the shank portion of the extension for rotation about an axis extending perpendicularly to the rotational axis of the extension. The valve member defines an opening which is positionable in fluid communication with the coolant passage extending axially of the shank portion. Thus, coolant from the passage flows through the opening defined by the rotatable valve member.

Notably, the rotatable valve member defines a sealing surface at one end of the opening therein, with the sealing surface configured for sealing engagement with the first tap having the axial coolant bore, in a first position of the valve member. In this manner, the tap extension is arranged to provide the first mode of operation, wherein coolant is delivered through the bore defined by the tap.

The rotatable valve member further defines a valve passage communicating with the opening defined by the member, which valve passage is provided at the opening generally opposite the sealing surface of the valve member. The second mode of operation of the tap extension is provided by positioning the rotatable valve member in a second position, whereby coolant flows through the valve opening and the valve passage to between the flutes of the second, solid tap. As in the first embodiment, coolant flow exteriorly of the tap is provided by first and second coolant grooves which provide a flow path between the valve member and the slots between the collet fingers of the tap extension.

Other features and advantages of the present invention will become readily apparent from the following detailed description, the accompanying drawings, and the appended claims.

BRIEF DESCRIPTION OF THE DRAWINGS

FIG. 1 is a side elevational view, in partial cross-section, of a tap extension embodying the principles of the present invention;

FIG. 2 is a view similar to FIG. 1, in full cross-section, illustrating use of the present tap extension with a cutting tap having an axial coolant bore;

FIG. 3 is a fragmentary, relatively enlarged cross-sectional view illustrating the present tap extension in use with a second, solid cutting tap;

FIG. 4 is an end view of the present tap extension taken generally along lines 4—4 of FIG. 1;

FIG. 5 is a fragmentary, cross-sectional view of an alternate embodiment of the present tap extension shown in use with a cutting tap having an axial coolant bore; and FIG. 6 is a view similar to FIG. 5 showing the alternate embodiment of the present tap extension in use with a second, solid cutting tap.

DETAILED DESCRIPTION

While the present invention is susceptible of embodiment in various forms, there is shown in the drawings and will hereinafter be described presently preferred and alternate embodiments, with the understanding that the present disclosure is to be considered as an exemplification of the invention, and is not intended to limit the invention to the specific embodiments illustrated.

With reference first to FIGS. 1-4, therein is illustrated a tap extension 10 embodying the principles of the present invention. As will be recognized by those familiar with the art, tap extension 10 is configured for connecting a thread-cutting tap in rotatably driven relation with an associated machine tool spindle, designated S. As will be further appreciated, the tap extension of the present invention is particularly suited for use with a spindle S having a coolant supply arrangement which supplies pressurized coolant, typically oil, into the tap extension at the end of the extension connected to the spindle.

The present tap extension includes a generally elongated body or shank portion 12 having a first end for connection to the spindle S in driven relation therewith. The extension further includes an arrangement at the second, opposite end of the shank portion for releasably receiving and retaining a cutting tap in driven relation with the tap extension.

To this end, the tap extension includes a plurality of circumferentially spaced collet fingers 14 at the second end of shank portion 12. In the illustrated embodiment, collet fingers 14 are integral with the shank portion 12 of the extension, with four collet fingers provided (see FIG. 4) between adjacent ones of which are defined slots 16.

In order to urge collet fingers 14 together into gripping relation with a tap received by the extension, a locking collar 18 is provided which is rotatably joined to the shank portion 12, and which extends generally about the collet fingers 14. Locking collar 18 is threadably connected with the shank portion 12 at a threaded connection 20, whereby rotation of the locking collar relative to the shank portion moves the locking collar axially of the shank, thereby urging the collet fingers 14 together by cooperation of the tapered surfaces of the locking collar and the fingers. A locking pin 22 is preferably provided to prevent inadvertent unthreading and removal of the locking collar 18.

As noted, pressurized coolant is supplied to the tap extension at the spindle S, and more particularly, is typically supplied by a tube which fits axially into the tap extension 10. The extension 10 thus includes a plug member 26 fitted within the shank portion 12 at its first end, with the plug member defining an axial bore which receives the coolant supply tube of the spindle.

Pressurized coolant from the spindle flows into a chamber defined by a bushing member 28 fitted within the shank portion 12, and held in position by plug member 26. Coolant then flows into an axially extending coolant passage, which in this embodiment is defined by an axially extending coolant tube 30 extending within an axial bore 32 defined by shank portion 12.

As illustrated, the end portion of coolant tube 30 positioned within bushing member 28 is preferably relatively enlarged, or is otherwise configured for sliding, sealing engagement with the interior of bushing member 28. To this end, the materials from which the coolant tube 30 and the bushing member 28 are formed are preferably selected for their sealing cooperation attendant to relative sliding movement.

As will be further described, coolant tube 30 is configured for cooperation with taps received within the collet fingers 14 at the free end of extension 10. To promote convenient insertion of taps into the extension, an arrangement is preferably provided whereby coolant tube 30 is biased and urged toward the tap-receiving end of the extension. In the illustrated embodiment, such biasing is effected by the provision of a biasing coil spring 34 fitted within bushing member 28, with the spring 34 acting against a washer 36, which in turn acts against coolant tube 30, thereby urging the coolant tube to the right, referring to the orientation of FIGS. 1–3. Plug member 26 holds spring 34 in position within bushing member 28, with the extension thus arranged such that an operator inserts a tap into the extension in opposition to the spring 34. The operator can then readily feel that the tap has been properly inserted into the extension.

The coolant tube 30 is further urged axially of the shank portion 12 attendant to hydraulic pressure of the coolant acting against the relatively enlarged portion of the coolant tube disposed within bushing member 28. This additional biasing force desirably acts to urge the end of the coolant tube 30 into sealing engagement with an associated tap, thereby assuring coolant flow in the intended manner, as will be described.

In accordance with the present invention, the present tap extension is provided with a valve arrangement whereby flow of coolant from machine tool spindle S can be selectively directed through an axial bore of an associated tap in a first mode of operation, or exteriorly of a solid tap in a second mode of operation. To this end, the valve arrangement comprises an end portion of the coolant tube 30 which defines a shoulder 40, and which further defines at least one, and preferably a pair as illustrated, of coolant slots 42 which communicate with the coolant passage defined by the tube 30.

The first mode of operation of the present path extension is illustrated in FIG. 2. In this first mode, a tap $T_C$ having an axial coolant bore is used, with the valve arrangement provided by the shouldered end portion of coolant tube 30 cooperating with the tap $T_C$. More specifically, the tap $T_C$ is fitted into the tap extension such that the end of the tap seats against shoulder 40, with the end portion of coolant tube 30 telescopically positioned within the axial coolant bore of the tap whereby flow through coolant slots 42 is blocked. As will be observed by comparing FIGS. 1 and 2, insertion of tap $T_C$ to the desired depth results in partial compression of spring 34, thus providing the operator with the desired "feel" as the tap is inserted.

After disposition of tap $T_C$ in the tap extension in this manner, locking collar 18 is rotated, thereby urging collet fingers 14 into gripping relation with the shank of the tap. Pressurized coolant is thus delivered from the coolant tube 30 through the axial bore of the tap, with hydraulic pressure acting against the relatively enlarged portion of the coolant tube urging the tube into sealing engagement with the tap $T_C$.

The manner in which the valve arrangement provided by the end portion of coolant tube 30 effects the second mode of operation is best illustrated in FIG. 3. In this mode of operation, flow of coolant exteriorly of a standard, solid tap, designated $T_F$, is contemplated, whereby coolant is directed along the shank of the tap to between its cutting flutes. Notably, this result is achieved by cooperation of the solid driven end portion of the tap $T_F$ with the shouldered end of coolant tube 30.

As shown in FIG. 3, solid tap $T_F$ is inserted into collet fingers 14, whereby the solid end of the tap engages and abuts the end of coolant tube 30. Thus, flow of coolant from within the tube passes through coolant slots 42 into a drive pocket, typically 4-sided and square in configuration, defined by shank portion 12 of the extension. The drive pocket receives and rotatably drives the typically square end portion of tap $T_C$, attendant to insertion of the tap into the extension.

In order to accommodate flow of coolant from coolant slots 40 exteriorly of the tap $T_F$, at least one, axially extending first coolant groove 44 is provided which is defined by the shank portion 12 at the drive pocket of the extension. As best shown in FIG. 4, it is presently contemplated that four such first grooves 44 be provided generally at each of the four sides of the drive pocket.

Flow of coolant exteriorly of the tap $T_F$ is further accommodated by at least one, and preferably four, second coolant grooves 46 which are defined by shank portion 12 generally at its threaded connection 20 with locking ring 18. Notably, second grooves 46 respectively provide fluid communication between each of the first coolant grooves 44, and each of the slots 16 defined between adjacent ones of the collet fingers 14.

Thus, in the second mode of operation wherein solid tap $T_F$ is being used, pressurized coolant from within tube 30 flows through coolant slots 42 into first coolant grooves 44, from grooves 44 into second coolant grooves 46, and from grooves 46 through slots 16 to between the cutting flutes of the tap.

Referring now to FIGS. 5 and 6, an alternate embodiment of the present tap extension, designated 110, is shown. In many respects, tap extension 110 is like the previously-described embodiment, and is configured for dual operational modes generally as above. For clarity, components of this further embodiment which generally correspond in function to those components of the above-described tap extension 10 are so-designated by like reference numerals in the one-hundred series.

Accordingly, tap extension 110 includes a shank portion 112 having a first end (not shown) adapted to be rotatably connected to the associated machine tool spindle S. The extension 110 includes a plurality of circumferentially spaced collet fingers 114, with a rotatable locking collar 118 rotatably joined to shank portion 112, and extending generally about collet fingers 114. Locking collar 118 is joined to the shank portion at threaded connection 120, with a locking pin 122 provided for preventing inadvertent removal of the locking collar from the shank portion.

In this embodiment, an axially extending coolant passage 125 is defined by the shank portion 112, with the passage 125 configured to receive pressurized coolant from the associated machine tool spindle. As in the previous embodiment, tap extension 110 further includes a valve arrangement for selectively controlling flow of coolant from passage 125, whereby coolant is directed through the axial bore of tap $T_C$ in a first mode of operation, or is directed exteriorly of solid tap $T_F$ in a second mode of operation.

To this end, tap extension 110 includes a rotatable valve member 127 which is fitted within shank portion 112, and which is manually rotatable about an axis extending perpendicular to the rotational axis of the shank portion. The valve member 127 defines a valve opening 129 extending therethrough perpendicularly to the rotational axis of the valve member, with the valve opening 129 being configured to be joined in fluid communication with coolant passage 125. Suitable seals 131 fitted about the valve member 127 effect sealing against coolant flow between the valve member and the shank portion 112.

Notably, the valve member 127 defines a sealing surface 133 generally at one end of valve opening 129. Further, the valve member 127 defines at least one valve passage 135, with a pair of valve passages 135 preferably provided by cutting the valve member transversely to its opening 129.

The dual modes of operation of tap extension 112 are respectively illustrated in FIGS. 5 and 6. In FIG. 5, the tap $T_C$ having the axial coolant bore is shown in position within tap extension 110. In this first mode of operation, valve member 127 is disposed in a first position, wherein the sealing surface 133 is positioned for sealing engagement with the end of tap $T_C$. Thus, pressurized coolant from passage 125 flows through valve opening 129, and into the axial bore of the tap so that it flows from the free end of the tap.

The second mode of operation of tap extension 110 is shown in FIG. 6, wherein the solid tap $T_F$ has been positioned within the extension. In this second mode of operation, valve member 127 is disposed in a second position after being rotated 180 degrees relative to its first position. In this second position, the solid tap $T_F$ abuts the valve member generally at the portion of the valve member whereat valve passages 135 are defined.

Thus, pressurized coolant from passage 125 flows through valve opening 129, and through valve passages 135 into the square drive pocket of the tap extension. Flow of coolant exteriorly of tap $T_F$ is accommodated by the provision of first coolant grooves 144 at the square drive pocket of the tap, and by second coolant grooves 146 which are in fluid communication with the first grooves. As in the previous embodiment, the second grooves 146 are in fluid communication with slots defined between adjacent ones of the collet fingers 114, whereby pressurized coolant flows from the grooves 146 between the collet fingers, to between the cutting flutes of the tap $T_F$.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. It is, of course, intended to cover by the appended claims all such modifications as fall within the scope of the claims.

What is claimed is:

1. A tap extension for connecting a cutting tap in rotatably driven relation with an associated spindle having coolant supply means, said tap extension comprising:

a shank portion having a first end for connection to said spindle in driven relation therewith;

locking means at a second end of said shank portion opposite said first end, said locking means being adapted to receive and releasably retain said tap in rotatably driven relation with said shank portion;

coolant passage means extending within and axially of said shank portion, said passage means being joined in fluid communication with said coolant supply means when said extension is connected to said spindle whereby coolant is delivered to said passage means; and valve means operatively associated with said passage means for controlling flow of coolant from said passage means, whereby (1) in a first mode of operation, coolant is delivered from said passage means to an axial coolant bore defined by a first tap, and (2) in a second mode of operation, coolant is delivered from said valve means to between flutes of a second, solid tap.

2. A tap extension in accordance with claim 1, wherein said locking means comprises collet means including a plurality of collet fingers adapted to grip said taps, and locking collar means joined to said shank portion and extending generally about said collet fingers so that rotation of said locking collar means relative to said shank portion urges said collet fingers together to grip said taps.

3. A tap extension in accordance with claim 2, wherein said shank portion defines a drive pocket for receiving and rotatably driving of said taps, said shank portion defining at least one first coolant groove at said drive pocket through which coolant flows to between the flutes of said sedond, solid tap in said second mode of operation.

4. A tap extension in accordance with claim 3, wherein said shank portion defines at least one second coolant groove providing fluid communication between said first coolant groove and a slot defined by adjacent ones of said collet fingers, whereby in said second mode of operation, coolant flows exteriorly of said second tap through said first coolant groove, said second coolant groove, and said slot to between the flutes of said second tap.

5. A tap extension in accordance with claim 1, wherein said valve means comprises an end portion of a coolant tube positioned within said shank portion and at least partially defining said coolant passage means, said end portion of said tube defining at least one coolant slot communicating with said coolant passage means, said end portion of said tube being positionable within the axial coolant bore of said first tap whereby flow through said coolant slot is blocked and coolant flows through said first tap to provide said first mode of operation, said end portion of said coolant tube being positioned to abut said second solid tap whereby coolant flows through said coolant slot to between the flutes of said second tap to provide said second mode of operation.

6. A tap extension in accordance with claim 5, including means for biasing said coolant tube axially of said shank portion into engagement with said taps.

7. A tap extension in accordance with claim 1, wherein said valve means comprises a valve member rotatably mounted within said shank portion for rotation about an axis perpendicular to the rotational axis of said tap extension, said valve member defining a valve opening positionable in fluid communication with said coolant passage means whereby the coolant delivered to said taps flows through said valve member.

8. A tap extension in accordance with claim 7, wherein
said valve member defines a sealing surface at one end of said valve opening for sealing engagement with said first tap in a first position of said valve member to provide said first mode of operation, said valve member further defining a valve passage communicating with said valve opening, whereby in a second position of said valve member coolant flows through said valve passage to between the flutes of said second, solid tap to provide said second mode of operation.

9. A tap extension for connecting a cutting tap in rotatably driven relation with an associated spindle having coolant supply means, said tap extension comprising:
a shank portion having a first end for connection to said spindle in driven relation therewith;
locking means at a second end of said shank portion opposite said first end, said locking means comprising a plurality of circumferentially spaced collet fingers, and locking collar means joined to said shank portion and extending generally about said collet fingers so that rotation of said locking collar means relative to said shank portion urges said collet fingers together to releasably grip and retain said tap in said tap extension;
a coolant tube defining coolant passage means extending within and axially of said shank portion, said passage means being joined in fluid communication with said coolant supply means when said tap extension is connected to said spindle whereby coolant is delivered to said passage means; and
valve means operatively associated with said coolant passage means for controlling flow of coolant from said passage means, said valve means comprising an end portion of said coolant tube which defines at least one coolant slot communicating with said coolant passage means, whereby (1) in a first mode of operation, said end portion of said coolant tube is positionable within an axial coolant passage defined by a first tap so that said coolant slot is blocked and coolant from said passage means defined by said coolant tube flows through said first tap, and (2) in a second mode of operation, said end portion of said coolant tube is positioned to abut a second, solid tap so that coolant from said passage means flows through said coolant slot to between flutes of said second tap.

10. A tap extension in accordance with claim 9, including
means defining at least one coolant flow path along the exterior of said second solid tap to accommodate flow of coolant from said coolant slot to between said flutes of said second tap.

11. A tap extension in accordance with claim 10, including
means biasing said coolant tube axially of said shank portion into engagement with said taps.

12. A tap extension in accordance with claim 9, wherein
said shank portion defines a drive pocket for receiving and rotatably driving said taps, said shank portion defining at least one first coolant groove at said drive pocket,
said shank portion further defining at least one second coolant groove providing fluid communication between said first coolant tube and a slot defined by adjacent ones of said collet fingers, whereby in said second mode of operation, coolant flows exteriorly of said second tap from said coolant slot defined by said coolant tube, through said first and second coolant grooves, through the slot between said adjacent collet fingers, and to between the flutes of said second tap.

* * * * *